US008346294B2

(12) United States Patent
Ladouceur et al.

(10) Patent No.: US 8,346,294 B2
(45) Date of Patent: Jan. 1, 2013

(54) APPEARANCE ADAPTABLE KEYPAD FOR A HANDHELD COMMUNICATION DEVICE

(75) Inventors: Norman Ladouceur, Waterloo (CA); Jason T. Griffin, Kitchener (CA); Steven Fyke, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1056 days.

(21) Appl. No.: 11/767,168

(22) Filed: Jun. 22, 2007

(65) Prior Publication Data

US 2008/0318617 A1 Dec. 25, 2008

(51) Int. Cl.
 *H04M 1/00* (2006.01)
(52) U.S. Cl. ............... 455/550.1; 455/575.1; 341/22
(58) Field of Classification Search ............... 455/550.1, 455/575.1, 90.1; 400/486; 341/22
 See application file for complete search history.

(56) References Cited

U.S. PATENT DOCUMENTS

| | | | |
|---|---|---|---|
| 6,885,849 B1 * | 4/2005 | Kim et al. | 455/90.3 |
| 2004/0119685 A1 | 6/2004 | Harries | |
| 2004/0165924 A1 * | 8/2004 | Griffin | 400/486 |
| 2004/0204197 A1 * | 10/2004 | Moon | 455/575.1 |
| 2005/0237228 A1 * | 10/2005 | Salman et al. | 341/22 |
| 2005/0261042 A1 * | 11/2005 | Kim | 455/575.4 |
| 2006/0005131 A1 * | 1/2006 | Tao | 715/702 |
| 2006/0028358 A1 | 2/2006 | Bollman | |
| 2006/0146027 A1 * | 7/2006 | Tracy et al. | 345/168 |
| 2008/0016465 A1 * | 1/2008 | Foxenland | 715/828 |

FOREIGN PATENT DOCUMENTS

| | | |
|---|---|---|
| EP | 0508563 A | 10/1992 |
| EP | 0691603 A | 1/1996 |
| WO | 2004054210 A | 6/2004 |

OTHER PUBLICATIONS

European Search Report 07110881.5. Dec. 27, 2007.
Examination Report dated Jul. 28, 2009. In corresponding application No. 07110881.5.
Notice of Allowance and Fee(s) due dated Mar. 30, 2010.In corresponding application No. 07110881.5.

* cited by examiner

*Primary Examiner* — Charles Appiah
*Assistant Examiner* — Alexander Yi
(74) *Attorney, Agent, or Firm* — Fitch, Even, Tabin & Flannery, LLP (57) ABSTRACT

A handheld communication device configurable between a telephone mode and an email mode is described. The handheld communication device has a body with a front face at which a user input is located. The user input includes an appearance-adaptable keypad configurable between a telephone keypad when the device is in the telephone mode, and a text entry keypad when the device is in the email mode. The telephone keypad includes a plurality of alphanumeric input keys. The telephone keypad is arranged in a standard telephone keypad layout when the device is in the telephone mode. The text entry keypad includes a plurality of alphabetic input keys. The text entry keypad is arranged in a standard text entry keyboard layout when the device is in the email mode.

23 Claims, 9 Drawing Sheets

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | | |
| Z | X | C | V | B | N | M | | | | | |

*FIG. 3a* (44a)

| 1 | 2 | 3 | 4 | 5 | 6 | 7 | 8 | 9 | 0 |
|---|---|---|---|---|---|---|---|---|---|
| Q | W | E | R | T | Z | U | I | O | P |
| A | S | D | F | G | H | J | K | L | | |
| Y | X | C | V | B | N | M | | | | | |

*FIG. 3b* (44b)

| 1 | 2 | 3 | 4 | 5 | 6 | 7 | 8 | 9 | 0 |
|---|---|---|---|---|---|---|---|---|---|
| A | Z | E | R | T | Y | U | I | O | P |
| Q | S | D | F | G | H | J | K | L | | |
| W | X | C | V | B | N | M | | | | | |

*FIG. 3c* (44c)

| 1 | 2 | 3 | 4 | 5 | 6 | 7 | 8 | 9 | 0 |
|---|---|---|---|---|---|---|---|---|---|
| | | | P | Y | F | G | C | R | L |
| A | O | E | U | I | D | H | Y | N | S |
| | Q | J | K | X | B | M | W | V | Z |

FIG. 12 though such devices were typically limited to

APPEARANCE ADAPTABLE KEYPAD FOR A HANDHELD COMMUNICATION DEVICE

FIELD

This disclosure, in a broad sense, is directed toward a handheld communication device that has wireless communication capabilities and the networks within which the wireless communication device operates. The present disclosure further relates to an appearance-adaptable keypad configurable between a telephone keypad and a text entry keypad.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to effect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another.

As the proliferation of wireless handheld communication devices continue, users increasingly send and receive email/text messages on their handheld communication devices. There is an increasing need to provide a keyboard that is conducive to sending email messages in addition to providing a simple to understand phone keypad arrangement. Thus, it is desirable to have a keyboard configurable to have an adaptable appearance for entering text and dialing telephone numbers.

BRIEF DESCRIPTION OF THE DRAWINGS

Examplary methods and arrangements conducted and configured according to the advantageous solutions presented herein are depicted in the accompanying drawings wherein.

DETAILED DESCRIPTION

Figure 1:
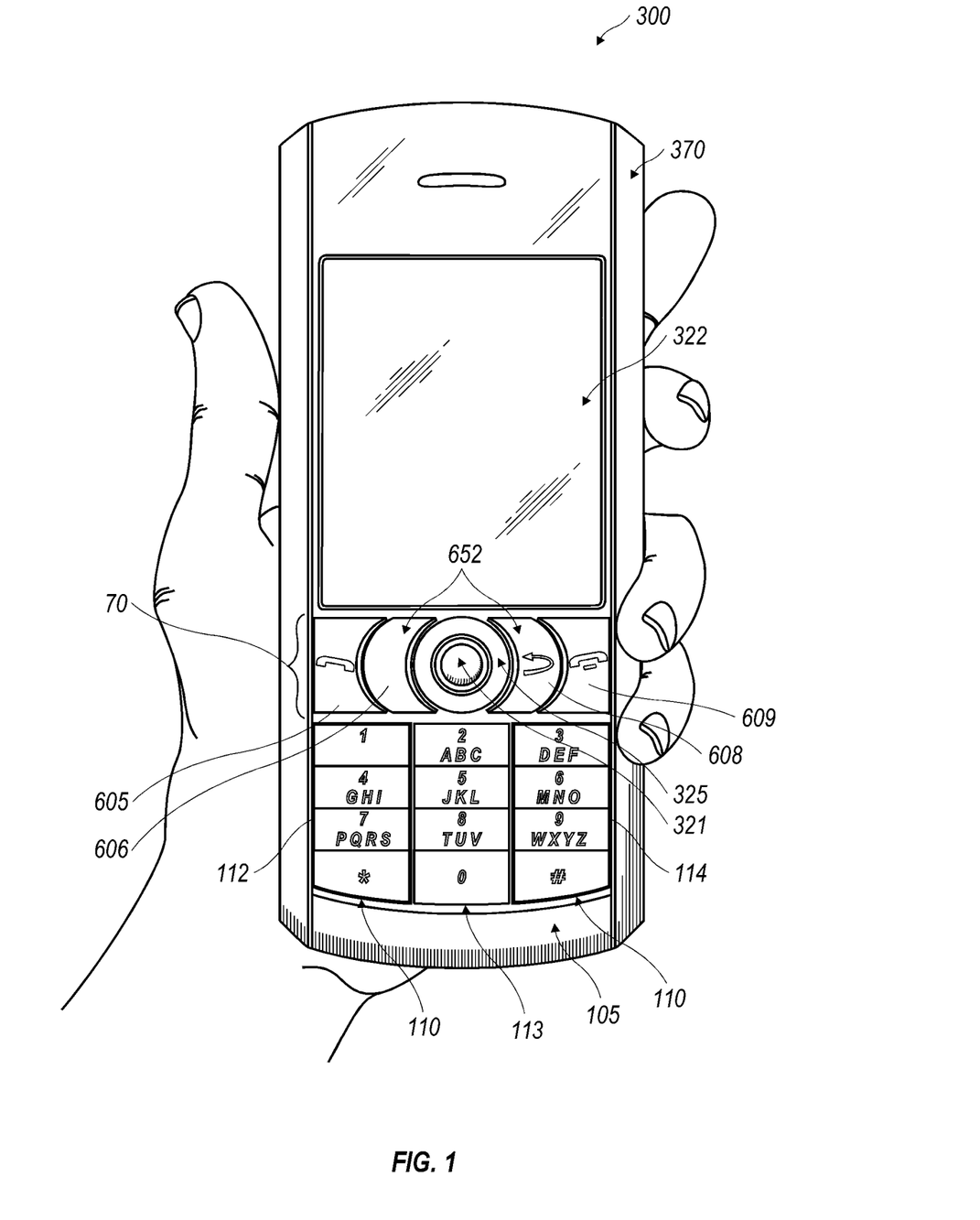
FIG. 1 illustrates a handheld communication device configured according to the present teachings cradled in the palm of a user's hand.
Figure 2:
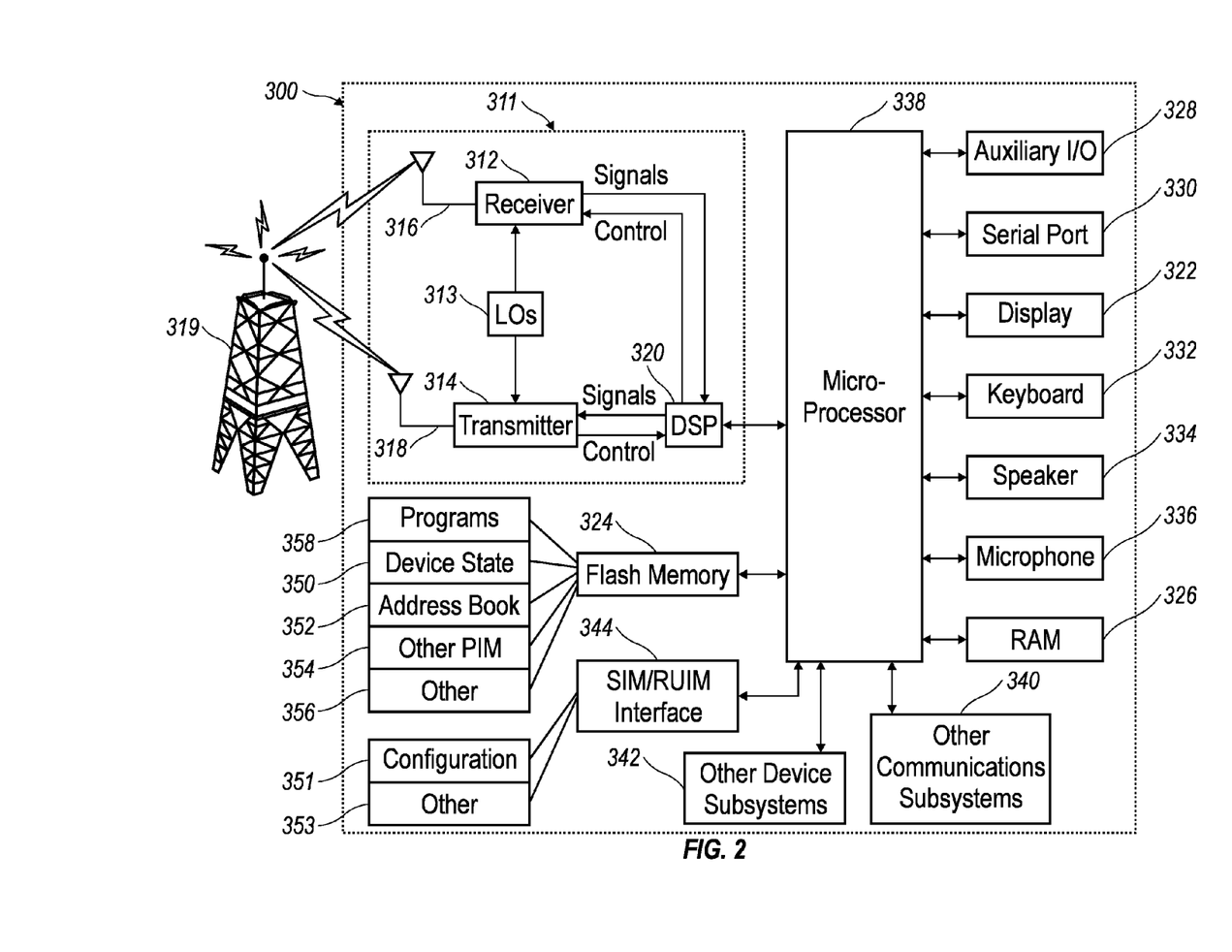
FIG. 2 is a block diagram representing a wireless handheld communication device interacting in a communication network.

An examplary handheld communication device 300 is shown in FIG. 1, and the device's cooperation in a wireless network 319 is exemplified in the block diagram of FIG. 2. These figures are examplary only, and those persons skilled in the art will appreciate the additional elements and modifications necessary to make the device 300 work in particular network environments.

As shown in the block diagram of FIG. 2, the device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the communication device 300.

The auxiliary I/O subsystem 328 can take the form of a variety of different navigation tools (multi-directional or single-directional) such as a trackball navigation tool 325 as illustrated in the examplary embodiment shown in FIG. 1, or a thumbwheel, a navigation pad, a joystick, or the like. These navigation tools are preferably located on the front surface of the handheld device 300 but may be located on any exterior surface of the handheld device 300. Other auxiliary I/O subsystems can include external display devices and externally connected keyboards (not shown). While the above examples have been provided in relation to the auxiliary I/O subsystem 328, other subsystems capable of providing input or receiving output from the handheld communication device 300 are considered within the scope of this disclosure. Additionally, other keys may be placed along the side of the handheld device 300 to function as escape keys, volume control keys, scrolling keys, power switches, or user programmable keys, and may likewise be programmed accordingly.

As shown in FIG. 1, keys arranged in the form of an appearance-adaptable keypad 105 are located on the front face 370 of the handheld device 300 allow the user to input textual data. The keys can be arranged such that both alphabetic and numeric input is enabled either separately or in combination. While keys, typically of a push-button or push-pad nature, perform well as data entry devices, they present problems to the user when they must also be used to effect navigational control over a screen-cursor. In order to solve this problem the present handheld communication device 300 preferably includes an auxiliary input such as a trackball navigation tool that acts as a cursor navigation tool and which is also exteriorly located upon the front face 370 of the handheld device 300. Its front face location is particularly advantageous because it makes the tool easily thumb-actuable like the keys of the keyboard. A particularly usable embodiment provides the navigational tool in the form of a trackball 321 which is easily utilized to instruct two-dimensional screen cursor movement in substantially any direction, as well as act as an actuator when the trackball 321 is depressed like a button. The placement of the navigation tool is preferably above the appearance-adaptable keypad 105 and below the display screen 322; here, it avoids interference during keyboarding and does not block the user's view of the display screen 322 during use. (See FIG. 1).

While the handheld device 300 shown in FIG. 1 is of a unibody construction, also known as a "candy-bar" design, other device constructions are considered within the scope of this disclosure. For example, the handheld device could be constructed such that it is of a flip-phone or clam shell design such that the device has a hinge that enables the length of the device to be reduced. Typically in the clam shell design, the phone folds in half such that the display screen is on an upper half and the keypad is on the lower half. In another embodiment, the keypad is enabled such that is capable of sliding behind another portion of the device such as the display screen portion of the handheld device.

As illustrated in FIG. 1, the present disclosure is directed to a handheld wireless communication device 300 configured to send and receive text messages. The handheld device 300 includes a hand cradleable body configured to be held in one hand by an operator of the device during text entry. A display 322 is included that is located on a front face 370 of the body and upon which information is displayed to the operator during text entry. A key field in the form of an appearance-adaptable keypad 105 is also located on the front face 370 of the elongate body and comprises a plurality of keys. A navigation row 70 including menu keys 652 and a navigation tool, such as the trackball navigation tool 325 as shown, is also located on the front face 370 of the body.

Figures 5, 6:
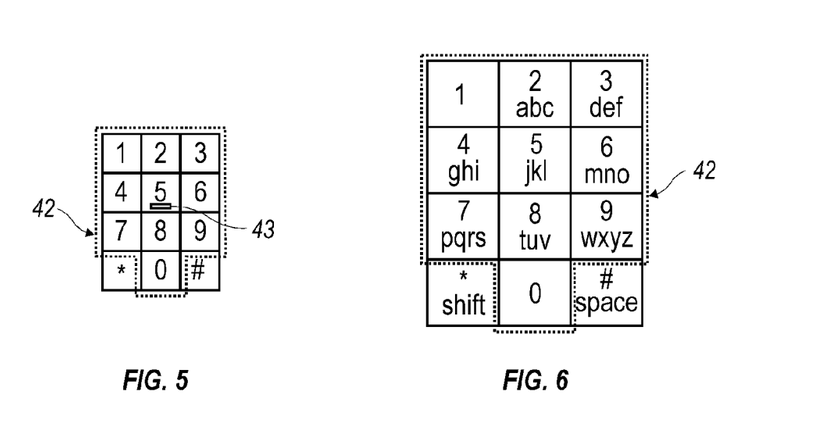
FIG. 5 illustrates ten digits comprising the numerals 0-9 arranged in a traditional, ITU Standard E.161 numeric telephone keypad layout, including the * and # keys flanking the 0 key.
FIG. 6 illustrates a traditional or standard phone key arrangement or layout according to the ITU Standard E.161 including both numerals and letters.
Figure 7:
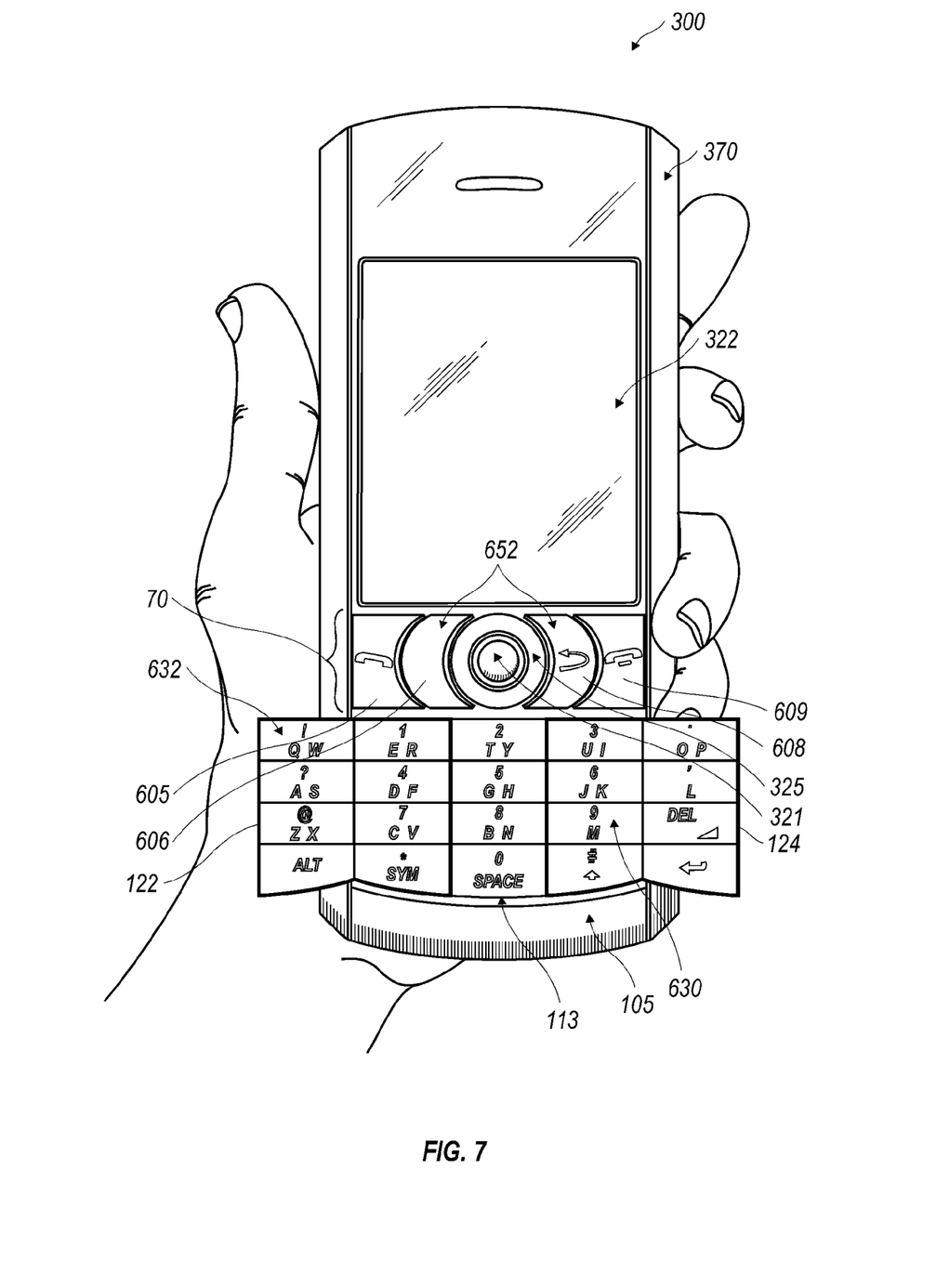
FIG. 7 illustrates an examplary handheld device with an expanded keyboard in a text entry configuration.

While in another configuration as shown in FIG. 7, the appearance-adaptable keypad 105 has at least alphabetic and alphanumeric keys, where the alphanumeric input keys comprise a plurality of alphabetic and/or numeric keys having letters and/or numbers associated therewith. The order of the letters of the alphabetic keys on the presently disclosed device can be described as being of a traditional, but non-ITU Standard E.161 layout. This terminology has been utilized to delineate the fact that such a telephone keypad as depicted in FIG. 6 may not allow for efficient text entry on the handheld device 300.

The handheld wireless communication device 300 is also configured to send and receive voice communications such as mobile telephone calls. To facilitate telephone calls, two call keys 605, 609 ("outer keys") are provided in the navigation row 70 (so-called because it includes the trackball navigation tool 325) at the outer ends of the navigation row 70. One of the two call keys is a call initiation key 605, and the other is a call termination key 609. The navigation row 70 also includes another pair of keys ("flanking keys") that are located immediately adjacent to the trackball navigation tool 325, with one flanking key on either side of the trackball navigation tool 325. It is noted that the outer keys are referred to as such not because they are necessarily the outermost keys in the navigation row—there may be additional keys located even further outwardly of the outer keys if desired—but rather because they are located outwardly with respect to the flanking keys. The flanking keys may, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys may, of course, be provided by buttons that are located elsewhere on the handheld device 300, with different functions assigned to the outer keys and the flanking keys.

Furthermore, the handheld device 300 is equipped with components to enable operation of various programs, as shown in FIG. 2. In an examplary embodiment, the flash memory 324 is enabled to provide a storage location for the operating system (not shown), device programs 358, and data (not shown). The operating system is generally configured to manage other application programs 358 that are also stored in memory 324 and executable on the processor 338. The operating system honors requests for services made by application programs 358 through predefined application program 358 interfaces. More specifically, the operating system typically determines the order in which multiple applications 358 are executed on the processor 338 and the execution time allotted for each application 358, the operating system also manages the sharing of memory 324 among multiple applications 358, handles input and output to and from other device subsystems 342, and so on. In addition, users can typically interact directly with the operating system through a user interface usually including the keyboard 332 and display screen 322. While in an examplary embodiment the operating system is stored in flash memory 324, the operating system in other embodiments is stored in read-only memory (ROM) or similar storage element (not shown). As those skilled in the art will appreciate, the operating system, device application 358 or parts thereof may be loaded in RAM 326 or other volatile memory.

In one examplary embodiment, the flash memory 324 contains programs/applications 358 for execution on the handheld device 300 including an address book 352, a personal information manager (PIM) 354, and the device state 350. Furthermore, programs 358 and other information 356 including data can be segregated upon storage in the flash memory 324 of the handheld device 300.

When the handheld device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The handheld communication device 300 may be able to operate some features without a SIM/RUIM card, but it will not be able to communicate with the network 319. A SIM/RUIM interface 344 located within the handheld device 300 allows for removal or insertion of a SIM/RUIM card (not shown). The SIM/RUIM card features memory and holds key configurations 351, and other information 353 such as identification and subscriber related information. With a properly enabled handheld communication device 300, two-way communication between the handheld communication device 300 and communication network 319 is possible.

If the handheld communication device 300 is enabled as described above or the communication network 319 does not require such enablement, the two-way communication enabled handheld device 300 is able to both transmit and receive information from the communication network 319. The transfer of communication can be from the handheld device 300 or to the handheld device 300. In order to communicate with the communication network 319, the handheld device 300 in the presently described examplary embodiment is equipped with an integral or internal antenna 318 for transmitting signals to the communication network 319. Likewise the handheld communication device 300 in the presently described examplary embodiment is equipped with another antenna 316 for receiving communication from the communication network 319. These antennae (316, 318) in another examplary embodiment are combined into a single antenna (not shown). As one skilled in the art would appreciate, the antenna or antennae (316, 318) in another embodiment are externally mounted on the handheld device 300.

When equipped for two-way communication, the handheld communication device 300 features a communication subsystem 311. As is well known in the art, this communication subsystem 311 is modified so that it can support the operational needs of the handheld device 300. The subsystem 311 includes a transmitter 314 and receiver 312 including the associated antenna or antennae (316, 318) as described above, local oscillators (LOs) 313, and a processing module 320 which in the presently described examplary embodiment is a digital signal processor (DSP) 320.

It is contemplated that communication by the handheld device 300 with the wireless network 319 can be any type of communication that both the wireless network 319 and handheld device 300 are enabled to transmit, receive and process. In general, these can be classified as voice and data. Voice communication is communication in which signals for audible sounds are transmitted by the handheld device 300 through the communication network 319. Data is all other types of communication that the handheld device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the handheld device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld communication device 300 to which this disclosure is directed is its size. While some users will grasp the handheld device 300 in both hands, it is intended that a predominance of users will cradle the handheld device 300 in one hand in such a manner that input and control over the handheld device 300 can be effected using the thumb of the same hand in which the handheld device 300 is held. However, it is appreciated that additional control can be effected by using both hands. As a handheld device 300 that is easy to grasp and desirably pocketable, the size of the handheld device 300 must be kept commensurately small. Of the device's dimensions, limiting its width is important for the purpose of assuring cradleability in a user's hand. Moreover, it is preferred that the width of the handheld device 300 be maintained at less than eight centimeters (approximately three inches). Keeping the handheld device 300 within these dimensional limits provides a hand cradleable unit that users prefer for its usability and portability. Limitations with respect to the height (length) of the handheld device 300 are less stringent when considering hand-cradleability. Therefore, in order to gain greater size, the handheld device 300 can be advantageously elongated so that its height is greater than its width, but still remains easily supported and operated in one hand.

A potential drawback is presented by the small size of the handheld device 300 in that there is limited exterior surface area for the inclusion of user input and device output features. This is especially true for the "prime real estate" on the front face 370 of the handheld device 300, where it is most advantageous to include a display screen 322 that outputs information to the user. The display screen 322 is preferably located above an appearance-adaptable keypad 105 that is utilized for data entry into the handheld device 300 by the user. If the screen 322 is provided below the appearance-adaptable keypad 105, a problem occurs in that viewing the screen 322 is inhibited when the user is inputting data using the appearance-adaptable keypad 105. Therefore it is preferred that the display screen 322 be above the input area, thereby solving the problem by assuring that the hands and fingers do not block the view of the screen 322 during data entry periods.

To facilitate textual data entry into the handheld device 300, an alphabetic keyboard is provided. In the examplary illustrated embodiment, a full alphabetic keyboard is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

The appearance-adaptable keypad 105 includes a plurality of keys that can be of a physical nature such as actuable buttons, or they can be of a software nature, typically constituted by virtual representations of physical keys on a display screen (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the display screen 322.

In the case of virtual keys, the indicia for the respective keys are shown on a display screen, which in one embodiment is enabled by touching the display screen, for example, with a stylus to generate the character or activate the indicated command or function. Some examples of display screens capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 3A:
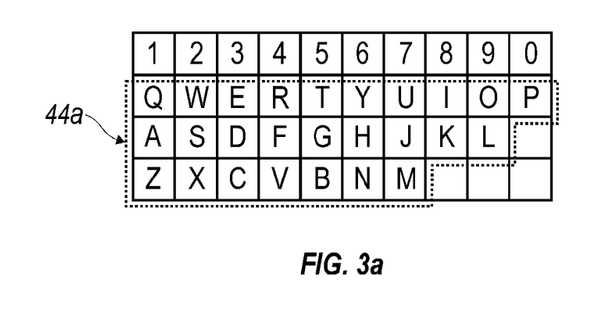
FIG. 3a illustrates an examplary QWERTY keyboard layout.
Figure 3B:
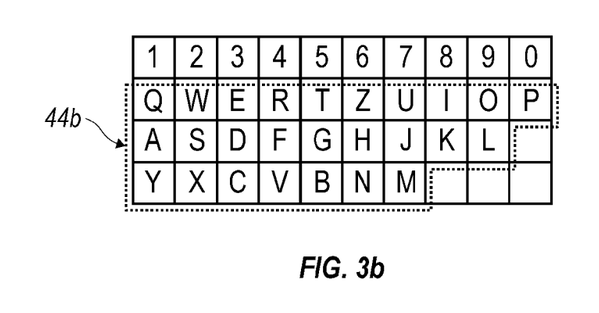
FIG. 3b illustrates an examplary QWERTZ keyboard layout.
Figure 3C:
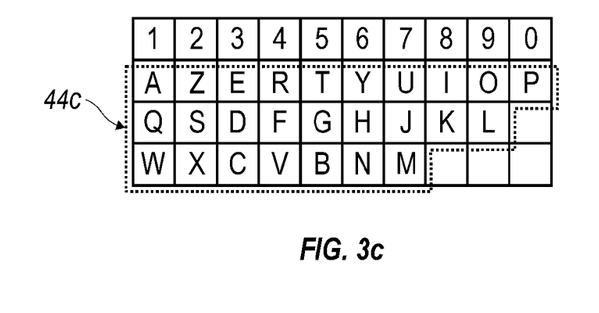
FIG. 3c illustrates an examplary AZERTY keyboard layout.
Figure 3D:
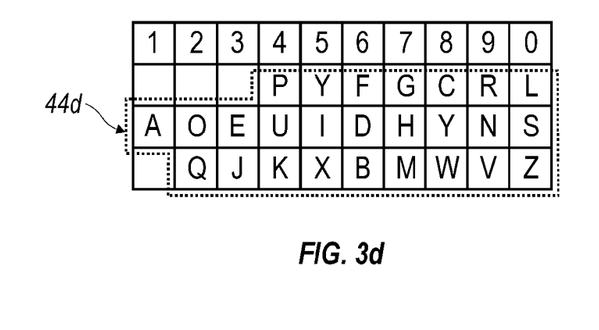
FIG. 3d illustrates an examplary Dvorak keyboard layout.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3a. The QWERTZ keyboard layout is normally used in German-speaking regions; this alphabetic key arrangement 44b is shown in FIG. 3b. The AZERTY keyboard layout 44c is normally used in French-speaking regions and is shown in FIG. 3c. The Dvorak keyboard layout was designed to allow typists to type faster; this alphabetic key arrangement 44d is shown in FIG. 3d. In other examplary embodiments, keyboards having multi-language key arrangements can be implemented.

Figure 4:
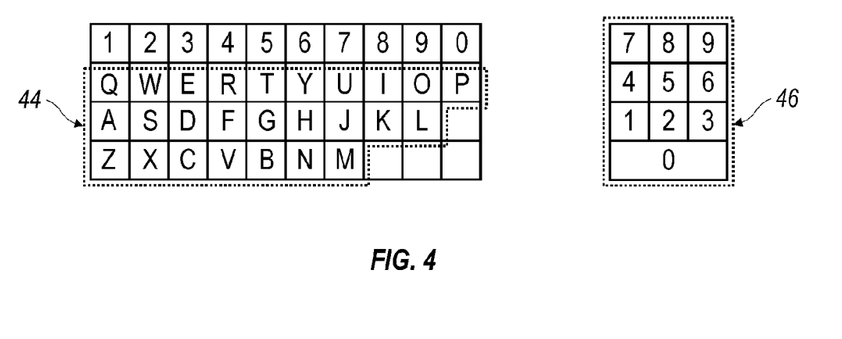
FIG. 4 illustrates a QWERTY keyboard layout paired with a traditional ten-key keyboard.

Alphabetic key arrangements are often presented along with numeric key arrangements. Typically, the numbers 1-9 and 0 are positioned in the row above the alphabetic keys 44a-d, as shown in FIG. 3a-d. Alternatively, the numbers share keys with the alphabetic characters, such as the top row of the QWERTY keyboard. Yet another examplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 5.

As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well.

Figure 9:
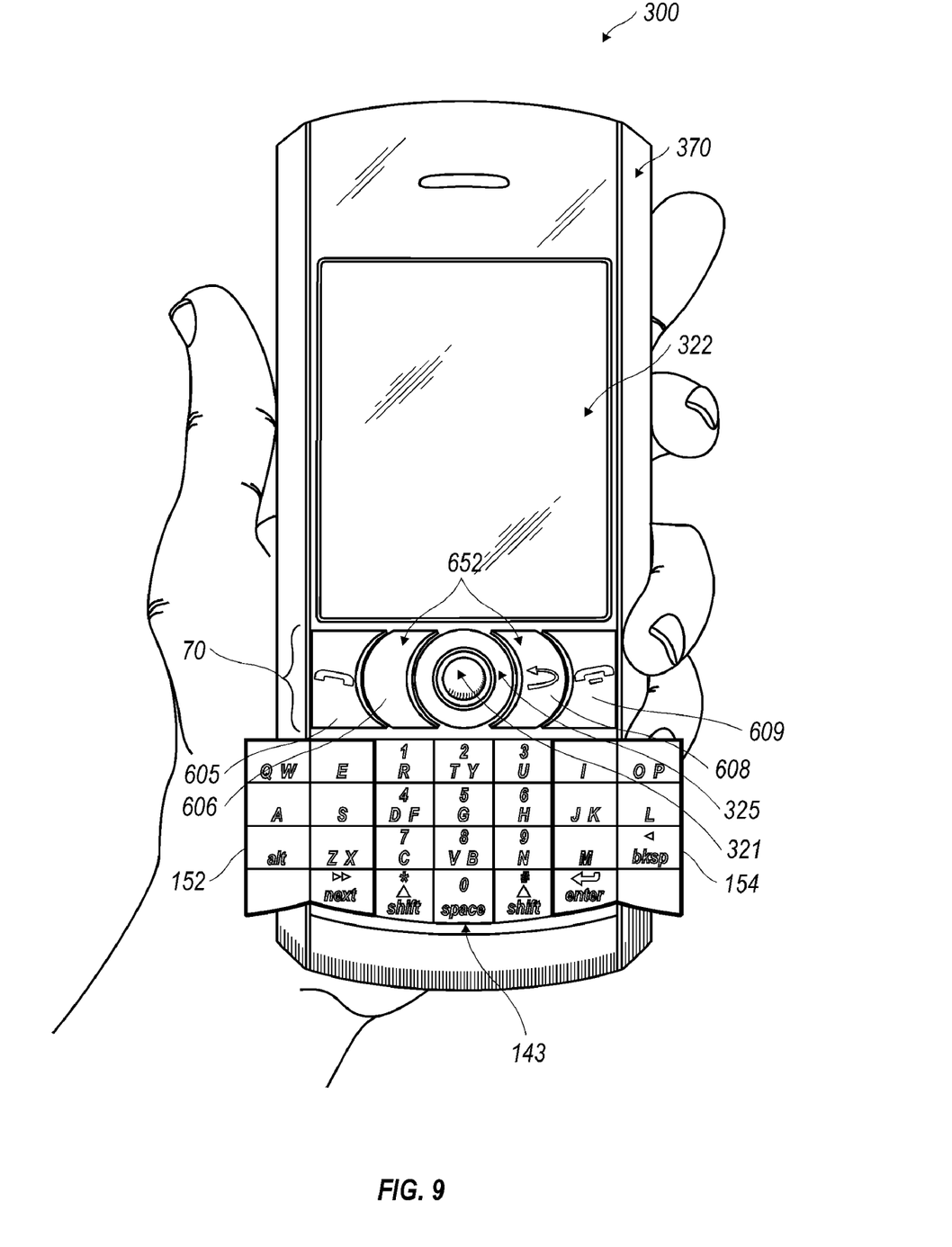
FIG. 9 illustrates an examplary handheld device of FIG. 8 where the keypad has been adapted to be configured in a text entry configuration.

As described above, the International Telecommunications Union ("ITU") has established phone standards for the arrangement of alphanumeric keys. The standard phone numeric key arrangement shown in FIG. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 9, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, QWERTZ, Dvorak, or AZERTY key layout. The keyboard layouts shown above can be generally classified as reduced arrangements where more than one alphabetic letter appears on at least one key. However, other layouts considered within the scope of this disclosure include only a single alphabetic letter per key and are termed full keyboard layouts. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

As communication of both voice and textual data from the handheld device is desirable, a keypad capable of accommodating both modes of communication is desirable. As described above, telephone keypads often are provided with letters of the alphabet in association with the numbers displayed on the telephone keypad. These letters have been traditionally arranged in alphabetic order with an occasional exception in some designs. Additionally users that are familiar with text entry on a computer are accustomed to particular arrangements of letters, such as the QWERTY, QWERTZ, AZERTY, and Dvorak layouts described above, on the keyboard or keypad of their computers. In order to accommodate the desire of users to have both types of entry available, an appearance-adaptable keypad that is capable of being configured as either a telephone keypad or a text entry keypad is described herein.

The appearance-adaptable keypad can take a variety of different forms, which include the examples provided herein below in addition to others. When the keypad is configured in a telephone keypad, the standard numeric orientation of the telephone keypad, as described above in relation to FIGS. 5 and 6, is shown on the keypad. Additionally, the alphabetic arrangement of letters shown in FIG. 6 is also displayed on the keypad. Alternatively, other known arrangements of alphabetic letters common on telephone keypads can be displayed. In these arrangements not all of the letters of the alphabet maybe shown such that the keypad could be lacking one of the letters "Q", "Z", "O". Other known examples for the arrangement of alphabetic letters on the numerical key of the telephone keypad are presented in the table below.

| | | | Mobile Phone Keypad | | |
|---|---|---|---|---|---|
| Number on Key | ITU E.161 | Australia | #1 | #11 (Europe) | #111 (Europe) |
| 1 | | QZ | | ABC | ABC |
| 2 | ABC | ABC | ABC | DEF | DEF |
| 3 | DEF | DEF | DEF | GHI | GHI |
| 4 | GHI | GHI | GHI | JKL | JKL |
| 5 | JKL | JKL | JKL | MNO | MNO |
| 6 | MNO | MNO | MN | PQR | PQR |

-continued

| | | | Mobile Phone Keypad | | |
|---|---|---|---|---|---|
| Number on Key | ITU E.161 | Australia | #1 | #11 (Europe) | #111 (Europe) |
| 7 | PQRS | PRS | PRS | STU | STU |
| 8 | TUV | TUV | TUV | ŬVW | VWX |
| 9 | WXYZ | WXY | WXY | XYZ | YZ |
| 0 | | | OQZ | | |

It should also be appreciated that other alphabetic character and number combinations can be used beyond those identified above when deemed useful to a particular application.

The telephone keypad with both numeric and alphabetic arrangements according to one of the above specified arrangements is useful in many circumstances. For example, the telephone arrangement has been used by consumers frequently such that the user can touch type the phone number without looking at the keypad. This also leads to operator acceptance of the device because the layout of the numeric arrangement is one known by the operator. Furthermore, the alphabetic arrangement shown on the keys is important in entering alphabetic codes for certain phone systems. For example, some phone systems require that the operator of the handheld device input letters corresponding to a person's name to reach that person's extension within the organization. These phone systems are based on dual tone multi-frequency (DTMF) codes. When the user is prompted to enter textual information using an automated phone system, the appropriate text can be entered by depressing the key associated with the desired letter which will be interpreted by the phone system. Likewise, when a pneumonic phone number is provided such that the phone number is provided as a name, the appropriate numbers can be dialed using the letters shown on the telephone keypad.

While the letters provided on the keypad allow for entry of text both internally to the phone and to phone systems equipped to handle DTMF codes, the letters arrangement is not preferred by some users. Many users prefer one of the above described arrangements, such as the QWERTY alphabetic arrangement, to enter text into the handheld communication device. These arrangements allow the user to enter text using a familiar layout. These layouts allow the user to type at greater speeds based on familiarity and other factors. In some instances, it is desirable to provide this arrangement of letters on more than nine keys to provide for increased efficiency in disambiguation. Thus, it is desirable to enable the device to have four, five, six, or seven columns of keys with a standard alphabetic keypad arrangement. These arrangements provide a reduced alphabetic arrangement on the keys while also typically providing for fewer letters per key than the standard telephone arrangements.

Methods and arrangements for a keyboard that is capable of being appearance-adaptable are presented herein that incorporate both a telephone keypad mode and a text entry keypad mode. In a first example, the handheld communication device 300 as shown in FIG. 1 has an appearance-adaptable keypad 105 arranged to have an appearance that is adapted to be in the form of a telephone keypad. In this orientation, the alphabetic arrangement of the telephone keypad is shown on the appearance-adaptable keypad 105. The appearance-adaptable keypad 105 is capable of adapting its appearance to a text entry keypad. In the text entry keypad mode, as shown in FIG. 7, the numbers remain displayed in a telephone keypad arrangement and the letters are configured such that letters are arranged in a standard layout. In the arrangement shown in FIG. 7, the two outboard columns 110 of the appearance-adaptable keypad 105 of FIG. 1 have been transitioned so that the number of columns is five instead of three.

As illustrated in FIG. 1, the two outboard columns 110 are positioned on transitionable key covers 112, 114 that support the keys in these two outboard columns of the telephone keypad as well as conceal four additional columns of keys 122, 124 of the text entry keypad on the backside of the transitionable key covers 112, 114 and beneath the transitionable key covers 112, 114. When the user desires to enter into a text entry configuration of the keypad, these transitionable key covers 112, 114 can be flipped open to expose the concealed keys. When the transitionable key covers 112, 114 are opened as in FIG. 7, the keypad extends latterly outboard of the area at the front face 370 of the handheld device 300 occupied by the telephone keypad. In order to transition between the closed and open configurations, manual input by the user is required such as lifting the transitionable key covers 112, 114 to an open position from a closed position. Alternatively, the transitionable key covers 112, 114 may be opened by depressing the transitionable key covers 112, 114 slightly such that at detent mechanism is released from its engaged and closed position to spring the transitionable key covers 112, 114 into an open position. Alternatively, the transitionable key covers 112, 114 may be open by operating a release mechanism such that the transitionable key covers 112, 114 are released from its engaged and closed position to spring the transitionable key cover into an open position. In at least one embodiment, when the user moves the transitionable key covers 112, 114 to the open position the program enters into a default program. This program could be an email application or other text entry application for instance. Furthermore, the application could be selected by the user of the handheld device or administrator controlled so that all users within an organization experience a unified configuration when the transitionable key covers are moved to the open configuration.

In other embodiments, the transitionable key covers 112, 114 can be computer controlled as well as mechanically controlled. For instance when the user selects an email or other text entry application from a home screen on the handheld device 300, the handheld device 300 can detect that a text entry application has been selected and send a signal to reconfigure the appearance-adaptable keypad 105 such that the text entry keypad is shown. The user could make the selection of the particular program by using the navigation tool 325. For instance, when a trackball navigation tool 325 is provided the user can roll the trackball over the desired program icon and make a selection by depressing the trackball 325. Upon depression of the trackball 325, a release mechanism could be activated such that the transitionable key covers 112, 114 are released from a closed position and allowed to move to an open position. Once in the open position the alphabetic arrangement presented on the text entry keypad is one of text entry arrangements described above. Once the user has finished making the desired text entry the transitionable key covers 112, 114 are moved to their closed position. In certain configurations, the handheld device is then enabled to revert to the home screen or telephone application. Alternatively, the text entry application such as an email application could be displayed until the user further uses one of the navigational input keys or navigation tool 325 to exit out of the particular application.

Figure 8:
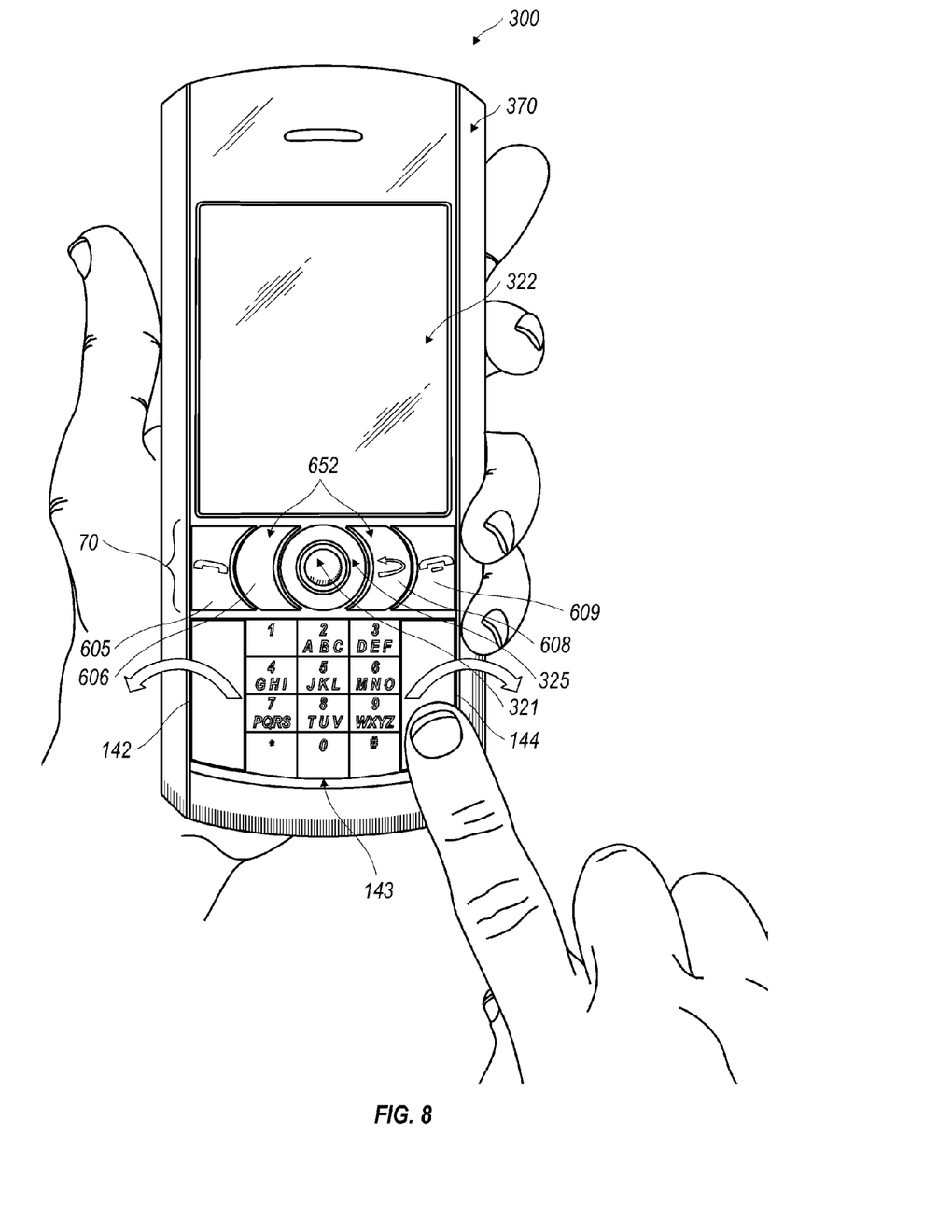
FIG. 8 illustrates another examplary handheld device with an alternative keypad configuration in a telephone keypad configuration.

In another arrangement, the transitionable key covers 142, 144 are arranged such that three columns are shown on the front face 370 of the handheld device 300 in FIG. 8 with a left side transitionable key cover 142 and a right side transitionable key cover 144 flanking the three columns of keys. The three columns of keys have alphabetic and numeric indicia shown on the plurality of keys. Additionally, symbols are shown on the lower left and right keys according to the standard telephone layout as described above. The transitionable key covers 142, 144 are shown in their closed position in FIG. 8. In FIG. 8, the user's finger is shown activating a release mechanism of the right side transitionable key cover 144 such that it is enabled to move to an open position.

FIG. 9 illustrates the text entry keypad wherein the transitionable key covers 142, 144 have been moved to an open position such that the text entry keys are exposed to the user of the device. The movement of the two transitionable key covers 142, 144 allow for two additional left columns of keys 152 and two additional right columns of keys 154 to be presented for text entry. This transition presents a total of seven columns of text entry keys to the user. Like the previously described arrangement for five columns of keys, the center three columns of keys retain the numbers associated with the telephone keypad. The alphabetic arrangement has been adapted such that a reduced QWERTY arrangement is presented on the columns of keys. While certain keys are shown as blank, these keys can be used to enable particular functions of the handheld device or can be user programmable soft-keys such that activation of one so these keys can launch a particular application, for instance, a camera or audio player. Furthermore, additional indicia could be provided on some of the alphabetic keys to allow for entry of particular symbols or other linguistic elements such as commas and periods.

The alphabetic arrangement shown on the telephone keypad of FIG. 8 differs from the alphabetic arrangement shown on the keypad of FIG. 9. For example, the alphabetic indicia associated with the keys labeled with numbers "2", "3", "4", "5", "6", "7", "8" and "9" is different in the telephone keypad of FIG. 8 as compared to the text entry layout of FIG. 9. In order to allow for the appearance of these keys to be adapted from the telephone keypad to the text entry keypad, a two-position light mask (not shown) is used. This light mask allows for a portion of the displayed indicia to be shown on the bottom portion of the key and to be transitionable from a first configuration to a second configuration. This is implemented such that no indicia is shown on that portion of the key permanently, but a transparent surface is provided such that a transition from a first configuration to a second configuration can be made using light. The two position light mask can be controlled by a microprocessor which detects the transition from the telephone keypad to the text entry keypad and correspondingly adjusts the alphabetic indicia displayed on the keys. While this transition has been described in relation to FIGS. 8 and 9, similar changes to the middle column 113 of the telephone keypad of FIG. 1 are possible as shown in FIG. 7. The keys in the columns that are concealed by the transitionable key covers 112, 114 do not require the use of a light mask to change the configuration of the alphabetic keys since these keys are only visible when the text keypad is shown as in FIG. 7. The masking arrangement described herein is related to a two position masking, but other masking options could be possible. The minimum amount the masking must be capable of achieving two positions such that a telephone keypad and text entry keypad are accommodated on the key arrangement. Furthermore, while the text entry arrangement as described herein includes numbers, other arrangements are possible that do not include the numbers, albeit such an arrangement may provide less functionality.

Figure 10:
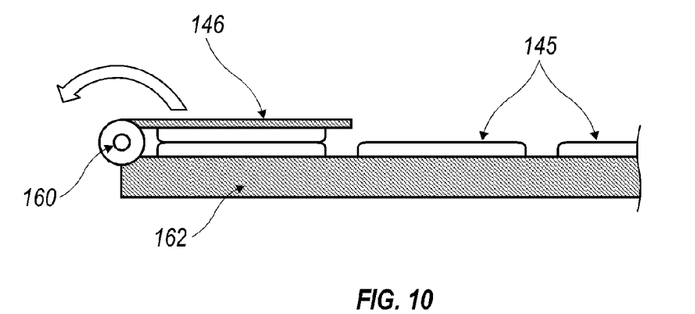
FIG. 10 illustrates a bottom view of an examplary keyboard adapted to a telephone keypad configuration.
Figure 11:
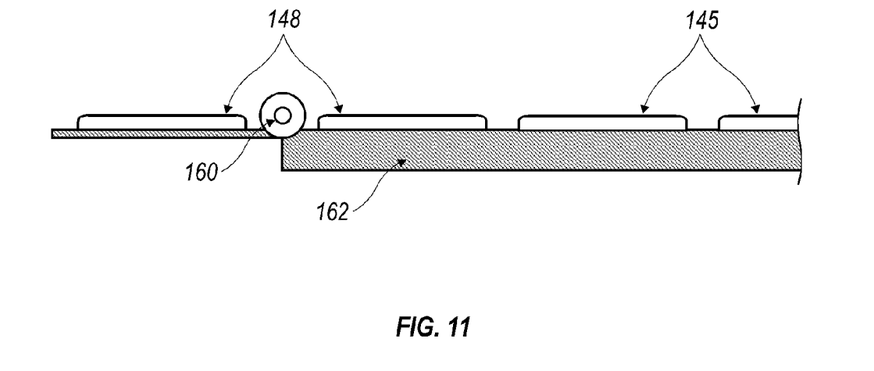
FIG. 11 illustrates another email message shown on the display screen, where the recipient is differentiated by color based upon a specified characteristic.

In order to provide a better illustration of a possible mechanism to enable the keys to transition from a closed to open configurations corresponding to the telephone keypad and text entry keypad orientations respectively, a bottom view of an example of the transitionable key covers is provided in FIGS. 10 and 11. In FIG. 10, the transitional key cover 146 is in the closed position. The outer surface of the front face of the transitionable key cover 146 has no key provided thereon. This configuration would be like that of the handheld device as shown in FIG. 8. If the transitionable key cover 146 is the one of FIG. 1, the outer surface of the transitionable key cover 146 would be provided with a key. Returning to FIG. 10, the transitionable key cover conceals keys 148 while keys 145 are exposed. Keys 145 correspond to the exposed keys on the front face of the handheld device as shown in FIG. 8. The keys are positioned on a surface 162 that supports the keys. A hinge or other pivoting member 160 is provided to allow the transitionable key cover to rotate from the closed position of FIG. 10 to the open position of FIG. 11. While this is provided as an example, other embodiments using sliding members to operate between the open and closed positions.

As described above, the handheld device 300 is configurable between a telephone mode and an email mode. The handheld device 300 has a body with a front face 370 at which a user input is located. In at least one embodiment, the user input comprises an appearance-adaptable keypad 105 configurable between a telephone keypad and a text entry keypad. The telephone keypad is used when the handheld device is in a telephone mode. Likewise, when the handheld device 300 is in an email mode or other text entry mode, the appearance-adaptable keypad 105 is configured as the text entry keypad. The telephone keypad comprises a plurality of alphanumeric input keys having letters and numbers associated therewith, where the letters and numbers are arranged in a standard telephone keypad layout, such as those described above, when the handheld device 300 is in telephone mode. In at least one embodiment, the telephone keypad comprises three columns of keys with letters and numbers arranged according to the ITU Standard E.161. While the text entry keypad comprises a plurality of alphabetic input keys having letters associated therewith, where the letters are arranged in a standard text entry keyboard layout, such as those described above, when the handheld device 300 is in the email mode. In at least one embodiment, the text entry keypad comprises five columns of keys with letters arranged in standard text entry key layout such as one of a QWERTY, QWERTZ, AZERTY, and Dvorak arrangements. In other embodiments, the number of columns in which the letters are arranged can be four, five, six, or seven. In at least one embodiment, the telephone keypad and at least a portion of the text entry keypad alternately occupy substantially the same area on the front face 370 of the handheld device 300. In some embodiments, the appearance-adaptable keyboard 105 includes a two-position light mask, which has a first configuration in which a telephone phone keypad is presented and a second configuration in which a text entry keypad is presented at the front face 370 of the handheld device 300.

In a particular arrangement, the number of columns for the telephone keypad is three (3), and the number of columns for the text entry keypad is five (5). In this configuration, three of the columns for the text entry keypad occupy the same space on the front face 370 of the handheld device 300 as the telephone keypad. Additionally, when the keypad is configured in the text entry keypad configuration, two outboard columns 152, 154 of the five columns are laterally outboard of the area at the front face 370 occupied by the telephone keypad. In order to accommodate the configuration change from telephone keypad to text entry keypad a transitional key cover with a closed configuration substantially obscures at least one column of the two outboard columns. In another embodiment, two transitional key covers 142, 144 are implemented such that one is on the left hand side (142) of the telephone keypad and one is on the right hand side (144) of the telephone keypad. When a transitional key cover is moved to an open configuration, it substantially exposes at least one column of the two outboard columns. The transitional key cover can be manually transitionable between the closed and open configurations. Alternatively, the transitional cover can be transitionable between the closed and open configurations using a release mechanism. Alternatively, the transitionable cover can be automated under the control of the microprocessor such that transitional key cover is moved between the closed and open configurations in correspondence with the handheld device transitioning from the telephone mode to the email mode. The transitional key cover can be configured to slide relative to the body of the handheld device between the closed and open configurations. Alternatively, the transitionable key cover can be configured to pivot relative to the body of the device between the closed and open configurations.

While the above has been described in relation to a text entry layout with five columns, other embodiments featuring different numbers of text entry columns can be presented as well. For example, the text entry keypad can have seven columns of alphabetic keys arranged in one of the above described standard text entry keyboard layouts. In this arrangement three columns of the text entry keypad occupy substantially the same area on the front face of the handheld device as the telephone keypad. The four outboard columns 152, 154 of text entry keypad occupy space at the front face of the device laterally outboard of the area occupied by the telephone keypad. Like the above described arrangement, a transitionable key cover having a closed and open configuration can be implemented such that in the closed configuration at least two columns of the four outboard columns are substantially obscured. When the transitionable key cover is in an open configuration at least two columns of the four outboard columns are substantially exposed. The translationable key cover moves relative the body of the handheld device between the closed and open configuration by one of a sliding and/or pivoting motion.

Figure 12:
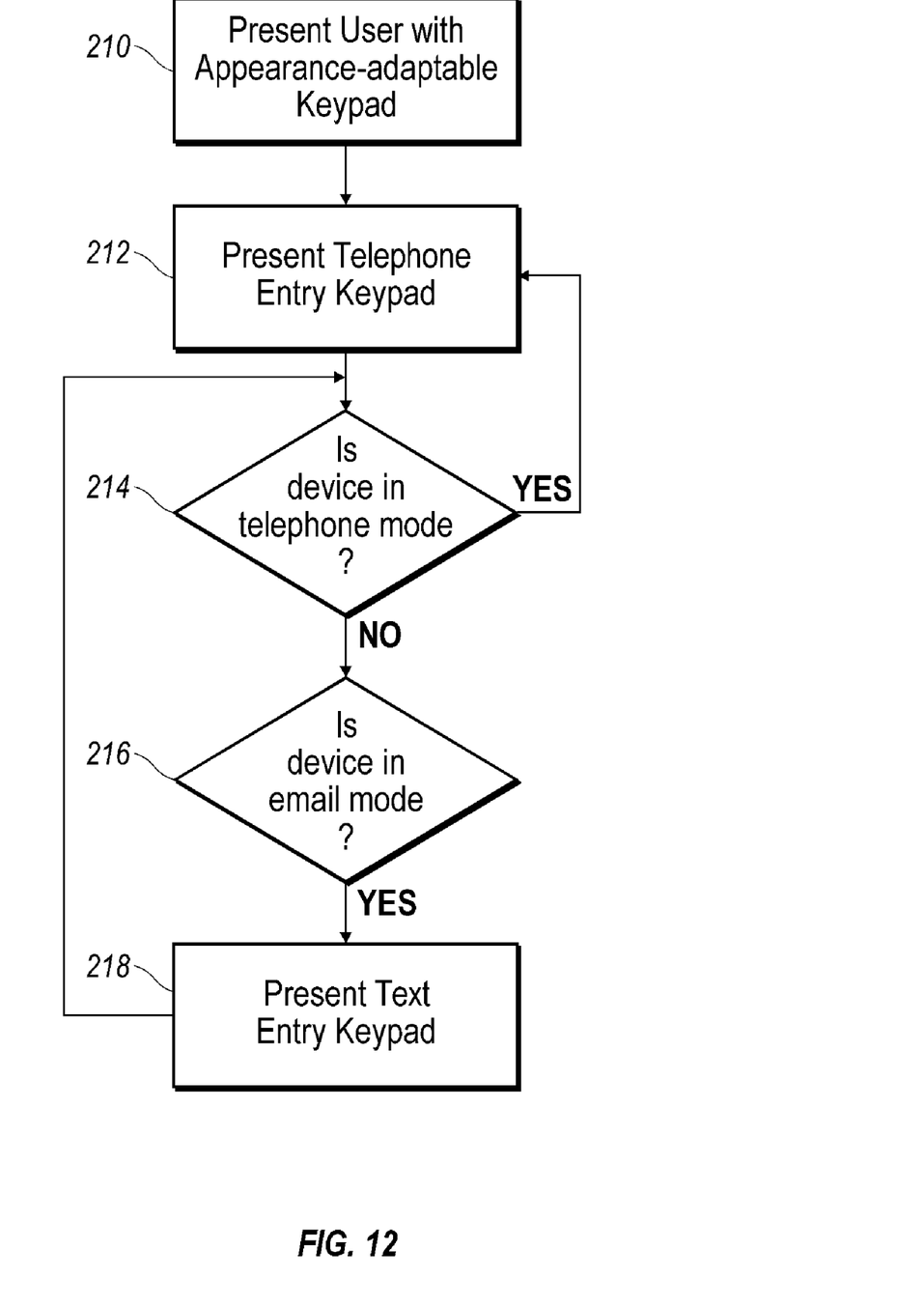
FIG. 12 is a flow chart illustrating an examplary method for an appearance-adaptable keypad configuration on a handheld device.

In another embodiment, an examplary method shown in FIG. 12 is presented for adapting a configurable keypad on a handheld device. In a first step, the method provides a handheld wireless communication device with a user input comprising an appearance-adaptable keypad configurable between a telephone keypad and a text entry keypad (block 210). The device is generally arranged using one of the embodiments described above. For example the user input could be located on the front face of the handheld device. The telephone keypad includes a plurality of alphanumeric input keys having letters and numbers associated therewith. The letters and numbers are arranged in a standard telephone keypad layout as described above. The text entry keypad includes a plurality of alphabetic input keys having letters associated therewith. The letters are arranged in a standard text entry keyboard layout as described above. In another step, the method includes transitioning the appearance-adaptable keypad from the telephone keypad to the text entry keypad in correspondence with transition of the device from the telephone mode to the email mode (blocks 212, 214, 216, 218). In yet another step, the method further includes transitioning the appearance-adaptable keypad from the text entry keypad to the telephone keypad in correspondence with transition of the device from email mode to telephone mode (blocks 218, 214, 212).

Examplary embodiments have been described hereinabove regarding both handheld wireless communication devices 300, as well as the communication networks 319 within which they operate. Again, it should be appreciated that the focus of the present disclosure is an appearance-adaptable keypad 105 configured to operate in both a telephone keypad mode and text entry keypad mode.

What is claimed is:

1. A handheld communication device configurable between a telephone mode and an email mode, said device comprising: a body having a front face at which a user input is located, said user input comprising an appearance-adaptable keypad configurable between a telephone keypad when the device is in the telephone mode and a text entry keypad when the device is in the email mode; said telephone keypad comprising a plurality of alphanumeric input keys having letters and numbers associated therewith, said letters and numbers being arranged in a standard telephone keypad layout when the device is in the telephone mode, wherein the plurality of alphanumeric keys associated with the telephone keypad are arranged in three columns including a central column; said text entry keypad comprising a plurality of alphabetic input keys having letters associated therewith, said letters being arranged in a standard text entry keyboard layout when the device is in the email mode, wherein the plurality of alphabetic input keys associated with the text entry keypad comprise at least five columns having two of the at least five columns are concealed by transitionable key covers and said central column being present in both the telephone keypad and the text entry key pad; and wherein closing of the transitionable key covers switches display of the keys on uncovered sides of keypad columns to display of the keys of the standard telephone keypad layout used for the telephone mode and opening of the transitionable key covers switches display of the keys on uncovered sides of keypad columns to display of keys of the standard text entry keyboard layout used for the email mode.

2. The handheld communication device as recited in claim 1, wherein said telephone keypad comprises three columns of keys with which letters and numbers of an ITU Standard E.161 telephone keypad layout are associated.

3. The handheld communication device as recited in claim 2, wherein the letters, of the at least five columns of alphabetic input keys associated with the text entry keypad, are arranged in the standard text entry keyboard layout.

4. The handheld communication device as recited in claim 3, wherein said letters associated with said alphabetic input keys of said text entry keypad are arranged in one of a QWERTY, QWERTZ, AZERTY, and Dvorak arrangement thereby facilitating text entry.

5. The handheld communication device as recited in claim 3, wherein said telephone keypad and at least a portion of said text entry keypad alternately occupy substantially the same area on the front face of the device.

6. The handheld communication device as recited in claim 3, said appearance-adaptable keypad further comprising a two-position light mask, said light mask having a first configuration in which said telephone keypad is presented at said front face of the body of the device and a second configuration in which said text entry keypad is presented at said front face of the body of the device.

7. The handheld communication device as recited in claim 3, wherein three of said at least five columns of said text entry keypad occupy substantially the same area on the front face of the device as said telephone keypad.

8. The handheld communication device as recited in claim 7, wherein two outboard columns of said at least five columns of said text entry keypad occupy space at the front face of the device laterally outboard of the area at the front face of the device occupied by said telephone keypad.

9. The handheld communication device as recited in claim 1, wherein said transitionable key cover further comprises an open configuration substantially exposing at least one column of said two outboard columns.

10. The handheld communication device as recited in claim 9, wherein said transitionable key cover is manually transitionable between the closed and open configurations by a user of the device.

11. The handheld communication device as recited in claim 9, wherein movement of said transitionable key cover between the closed and open configurations is automated under the control of a microprocessor on the device in correspondence with the device transitioning from the telephone mode to the email mode.

12. The handheld communication device as recited in claim 9, wherein said transitionable key cover slides relative to the body of the device between the closed and open configurations.

13. The handheld communication device as recited in claim 9, wherein said transitionable key cover pivots relative the body of the device between the closed and open configurations.

14. The handheld communication device as recited in claim 1, further comprising: a lighted display located above said appearance-adaptable keypad at the front face of the device; and a navigation tool located essentially between said lighted display and said appearance-adaptable keypad at the front face of the device.

15. The handheld communication device as recited in claim 2, wherein:
said text entry keypad comprises seven columns of alphabetic input keys with which letters arranged in the standard text entry keyboard layout are associated;
three of said seven columns of said text entry keypad occupy substantially the same area on the front face of the device as said telephone keypad; and
four outboard columns of said seven columns of said text entry keypad occupy space at the front face of the device laterally outboard of the area at the front face of the device occupied by said telephone keypad.

16. The handheld communication device as recited in claim 15, said device further comprising a transitionable key cover having a closed configuration substantially obscuring at least two columns of said four outboard columns and wherein said key cover further comprises an open configuration substantially exposing at least two columns of said four outboard columns.

17. The handheld communication device as recited in claim 16, wherein said transitionable key cover moves relative to the body of the device between the closed and open configurations by one of sliding and pivoting motion.

18. A method for configuring a handheld communication device between a telephone mode and an email mode, said method comprising: providing a handheld communication device comprising a body having a front face at which a user input is located, the user input comprising an appearance-adaptable keypad configurable between a telephone keypad when the device is in the telephone mode and a text entry keypad when the device is in the email mode, the telephone keypad comprising a plurality of alphanumeric input keys having letters and numbers associated therewith, the letters and numbers being arranged in a standard telephone keypad layout when the device is in the telephone mode, wherein the plurality of alphanumeric keys associated with the telephone keypad are arranged in three columns including a central column, the text entry keypad comprising a plurality of alphabetic input keys having letters associated therewith, the letters being arranged in a standard text entry keyboard layout when the device is in the email mode, wherein the plurality of alphabetic input keys associated with the text entry keypad comprise at least five columns having two of the at least five columns are concealed by transitionable key covers and said central column being present in both the telephone keypad and the text entry keypad; transitioning the appearance-adaptable keypad from the telephone keypad to the text entry keypad in correspondence with transition of the device from the telephone mode to the email mode; transitioning the appearance-adaptable keypad from the text entry keypad to the telephone keypad in correspondence with transition of the device from the email mode to the telephone mode; and wherein closing of the transitionable key covers switches display of the keys on uncovered sides of keypad columns to display of the keys of the standard telephone keypad layout used for the telephone mode and opening of the transitionable key covers switches display of the keys on uncovered sides of keypad columns to display of keys of the standard text entry keyboard layout used for the email mode.

19. A handheld communication device comprising: a body; an appearance-adapted keypad configurable between a first configuration and a second configuration; wherein in the first configuration keys have letters and numbers associated therewith in a telephone keypad arrangement and are arranged in three columns; wherein in the second configuration keys have letters arranged in a standard text entry arrangement and are arranged in at least five columns; a central column being present in both the telephone keypad and the text entry keypad; and wherein closing of transitionable key covers switches display of the keys on uncovered sides of keypad columns to display of the keys of the telephone keypad arrangement in the first configuration used for a telephone mode and opening of transitionable key covers switches display of the keys on uncovered sides of keypad columns to display of the keys of the standard text entry arrangement in the second configuration used for an email mode.

20. The communication device as recited in claim 19, wherein the second configuration keys comprise at least seven columns.

21. The communication device as recited in claim 19 further comprising at least one transitionable key cover, which conceals at least two columns of keys of the second configuration.

22. The communication device as recited in claim 21, wherein the at least one transitionable key cover comprises two transitionable key covers each concealing at least two columns of keys of the second configuration.

23. The communication device as recited in claim 21, wherein the at least one transitionable key cover comprises two transitionable key covers each concealing at least four columns of keys of the second configuration.

* * * * *